US012676489B1

(12) United States Patent
Price et al.

(10) Patent No.: US 12,676,489 B1
(45) Date of Patent: Jul. 7, 2026

(54) AUTOMATED OPTIMIZED INSTRUCTION OF ENERGY AND LOAD RESOURCE NETWORKS

(71) Applicant: Hunt Energy Network, L.L.C., Dallas, TX (US)

(72) Inventors: Daniel Gregory Price, Dallas, TX (US); Mohammad Tayabur Rahman, Richardson, TX (US); Mohammad Zulhasnine, Wylie, TX (US); Naga Parameswara Rao Devineni, Southlake, TX (US); Corey Lee Frye, Dallas, TX (US); Nick Joseph Babikian, Dallas, TX (US); Todd Willard Benson, Dallas, TX (US)

(73) Assignee: Hunt Energy Network, L.L.C., Dallas, TX (US)

( * ) Notice: Subject to any disclaimer, the term of this patent is extended or adjusted under 35 U.S.C. 154(b) by 454 days.

(21) Appl. No.: 18/356,940

(22) Filed: Jul. 21, 2023

Related U.S. Application Data

(60) Provisional application No. 63/391,174, filed on Jul. 21, 2022.

(51) Int. Cl.
*H02J 3/00* (2026.01)
*G06Q 50/06* (2012.01)
(Continued)

(52) U.S. Cl.
CPC ................ *H02J 3/46* (2013.01); *G06Q 50/06* (2013.01); *H02J 3/003* (2020.01); *H02J 3/004* (2020.01);
(Continued)

(58) Field of Classification Search
None
See application file for complete search history.

(56) References Cited

U.S. PATENT DOCUMENTS

| | | | | |
|---|---|---|---|---|
| 11,695,274 B1 * | 7/2023 | Lemsaddek | ....... | H02J 13/00028 |
| | | | | 700/295 |
| 11,747,781 B1 * | 9/2023 | Lemsaddek | ............. | H02J 3/381 |
| | | | | 700/295 |

(Continued)

*Primary Examiner* — Ariel Mercado-Vargas
(74) *Attorney, Agent, or Firm* — Baker Botts L.L.P.

(57) ABSTRACT

A computer-implemented method is executed using a global energy management system computer in an energy and load resource network, the energy and load resource network comprising a plurality of energy generating resources, a plurality of load resources, a plurality of energy storage resources, and a plurality of virtual energy resources, the computer-implemented method comprising receiving a plurality of energy market data and a plurality of capacity market data items; executing an inference stage of a trained machine learning model over the plurality of energy market data and the plurality of capacity market data items to output predictions of generating capacity and load requirements; executing an optimization algorithm over the predictions of generating capacity and load requirements to output a plurality of optimized generating capacity and load requirements; forming a plurality of operational instructions for a plurality of the resources in the energy and load resource network, the plurality of operational instructions being formatted to cause the plurality of the resources in the energy and load resource network to conform to the plurality of optimized generating capacity and load requirements; transmitting the plurality of operational instructions to the plurality of the resources in the energy and load resource network to instruct the plurality of the resources in the energy and load resource network to conform to the plurality of optimized generating capacity and load requirements.

8 Claims, 11 Drawing Sheets

(51) Int. Cl.
   *H02J 3/46*          (2026.01)
   *H02J 103/30*        (2026.01)
   *H02J 103/35*        (2026.01)

(52) U.S. Cl.
   CPC ....... *H02J 2103/30* (2026.01); *H02J 2103/35*
                                          (2026.01)

(56)                   References Cited

U.S. PATENT DOCUMENTS

| | | | |
|---|---|---|---|
| 2015/0278968 A1* | 10/2015 | Steven ................... | G06Q 50/06 |
| | | | 705/7.35 |
| 2017/0005515 A1* | 1/2017 | Sanders ................... | H02J 3/388 |
| 2019/0181680 A1* | 6/2019 | Magnani ................... | H02J 3/38 |
| 2022/0109303 A1* | 4/2022 | Srinivasan .............. | H02J 3/381 |
| 2023/0222388 A1* | 7/2023 | Cella ........................ | G06N 3/04 |
| | | | 706/12 |
| 2023/0305587 A1* | 9/2023 | Thirumurthy ........... | B60L 53/11 |
| 2023/0402848 A1* | 12/2023 | Ooka ........................ | H02J 3/32 |

* cited by examiner

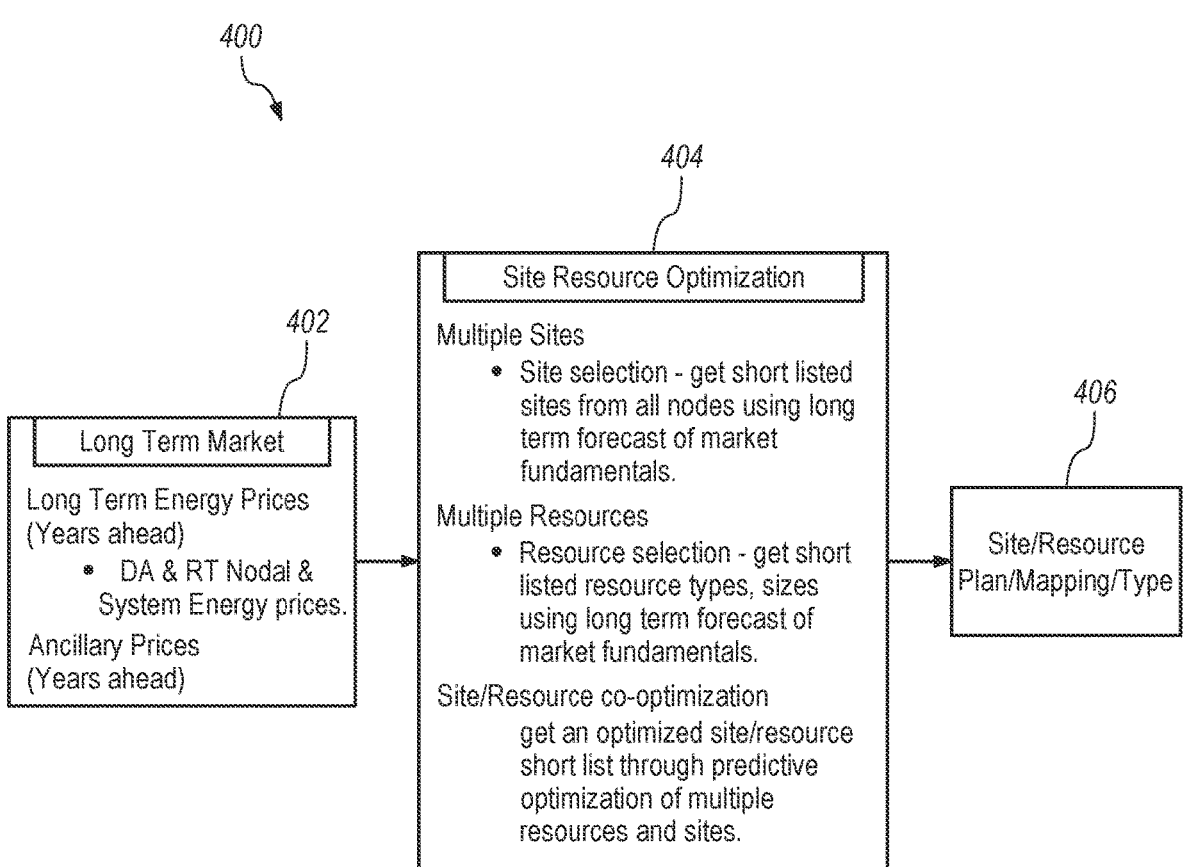

*400*

*404*

Site Resource Optimization

Multiple Sites
- Site selection - get short listed sites from all nodes using long term forecast of market fundamentals.

Multiple Resources
- Resource selection - get short listed resource types, sizes using long term forecast of market fundamentals.

Site/Resource co-optimization
get an optimized site/resource short list through predictive optimization of multiple resources and sites.

*402*

Long Term Market

Long Term Energy Prices (Years ahead)
- DA & RT Nodal & System Energy prices.

Ancillary Prices (Years ahead)

*406*

Site/Resource Plan/Mapping/Type

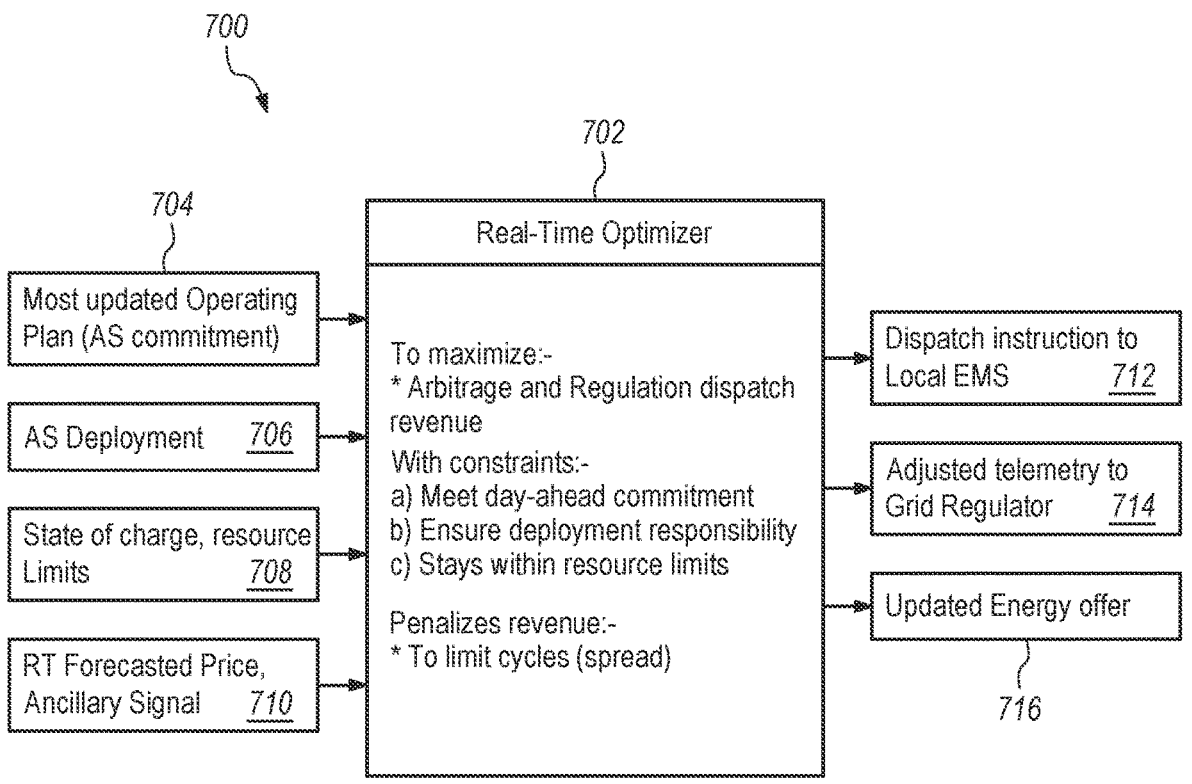

Real-Time Optimizer

Most updated Operating
Plan (AS commitment)

AS Deployment     706

State of charge, resource
Limits                708

RT Forecasted Price,
Ancillary Signal     710

To maximize:-
* Arbitrage and Regulation dispatch
revenue

With constraints:-
a) Meet day-ahead commitment
b) Ensure deployment responsibility
c) Stays within resource limits Penalizes revenue:-
* To limit cycles (spread)

Dispatch instruction to
Local EMS          712

Adjusted telemetry to
Grid Regulator     714

Updated Energy offer

AUTOMATED OPTIMIZED INSTRUCTION OF ENERGY AND LOAD RESOURCE NETWORKS

BENEFIT CLAIM

This application claims the benefit under 35 U.S.C. § 119 of provisional application 63/391,174, filed Jul. 21, 2022, the entire contents of which are hereby incorporated by reference for all purposes as if fully set forth herein.

TECHNICAL FIELD

One technical field is the automated control of resources in an Energy and Load Resource Network (ELRN). Another technical field is autonomous network forecasting and optimization using machine learning models, as applied to the automated analysis of data for energy resources and load resources in energy networks.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Contemporary utility-scale energy production and energy consumption facilities at are often individually analyzed from the standpoint of capacity and price. Large energy producers, consumers, traders, and market analysis may assess different capacity and energy market products such as Energy Arbitrage, Energy Adders, Ancillary Services (AS), Day-Ahead (DA) Market factors including generation, load, and price, and Real-Time (RT) Market factors. To date, a holistic evaluation of these facilities, products, and factors has been difficult or impossible. While vast amounts of data are available in siloed systems, integrating the data in a useful manner and forming actionable instructions on an automated basis, using computer support, has been unavailable. The inability to adequately assess these issues, and instruct resources on how to operate based on a complex analysis of all available information, has led to less grid reliability and poorer economic performance.

Based on the foregoing, the referenced technical fields have developed an acute need for better ways to enhance grid reliability and improve economic performance for multiple different energy generation, storage, and load resources.

SUMMARY

The appended claims may serve as a summary of the invention.

BRIEF DESCRIPTION OF THE DRAWINGS

In the drawings:

FIG. 4 is a diagram illustrating traDER Max Long term Forecast and Site/Resource Optimization, according to particular embodiments;

FIG. 7 is a diagram illustrating traDER Max Real-Time Optimization and Operation, according to particular embodiments.

DESCRIPTION OF EXAMPLE EMBODIMENTS

1. General Overview

Figure 1:
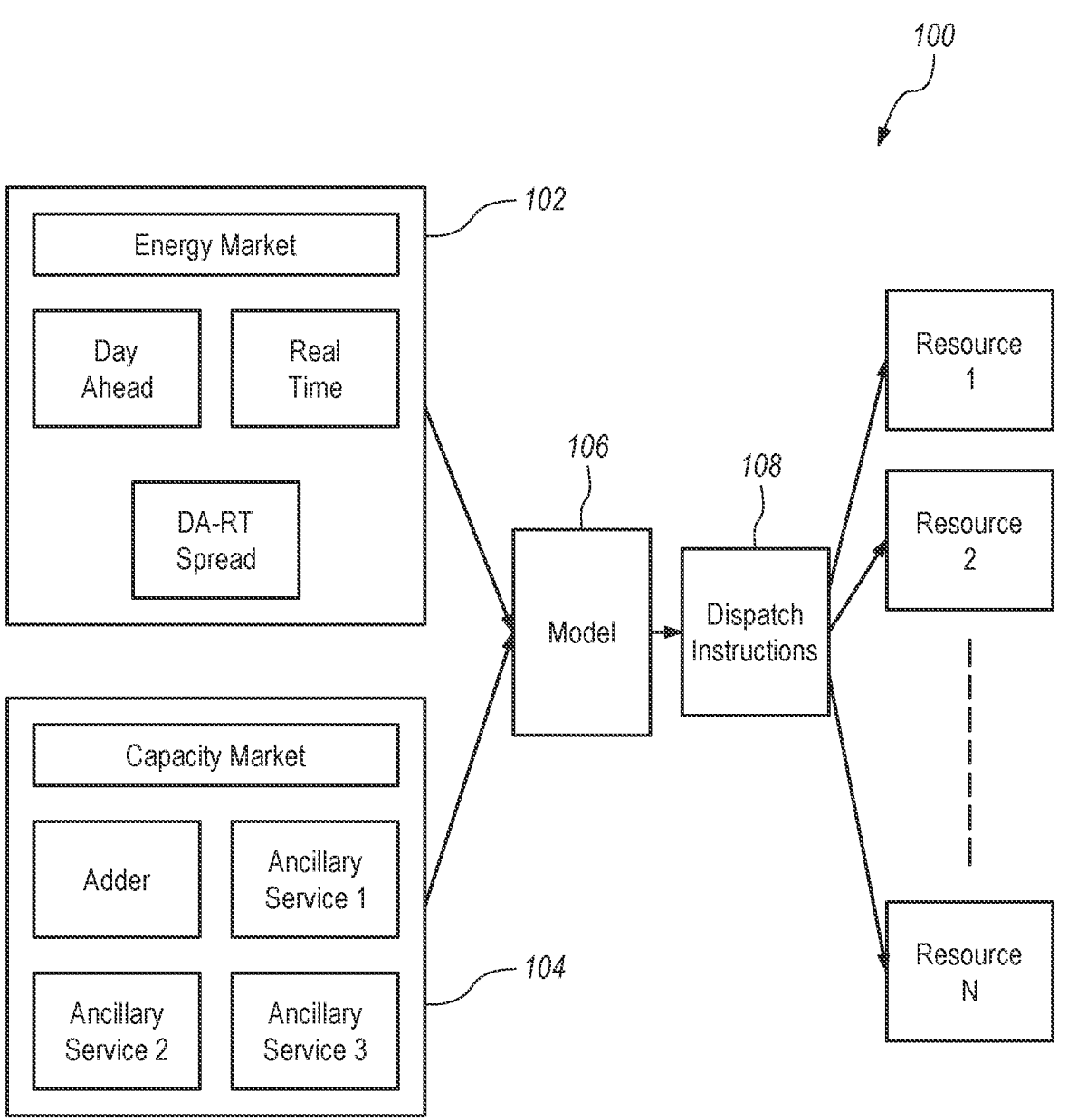
FIG. 1 is a diagram illustrating methods and systems of combining different capacity and energy market products, according to particular embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

This disclosure relates generally to computer-implemented methods and systems with which an entity can participate in different markets based on digitally stored data describing an Energy and Load Resource Network (ELRN). In one embodiment, the disclosure provides computer-implemented methods and systems to develop an end-to-end autonomous system for an ELRN. An "end-to-end autonomous system," in this context, can be a computer system that is programmed to read, retrieve, or obtain data describing a plurality of different products and services of an energy market and a capacity market, train one or more machine learning models, execute a plurality of different forecasts concerning supply and demand, execute one or more optimization algorithms to digitally create and store a plan for using the products and services, and automatically transmit or dispatch instructions to a plurality of different resources. Optimization can comprise, in part, executing an inference stage of the trained machine learning model over energy market data and capacity market data items to output predictions of generating capacity and load requirements.

In one embodiment, the disclosure provides a method and system of combining different capacity and energy market products (for example, Energy Arbitrage, Energy Adders, Ancillary Services (AS), Day-Ahead (DA) Market, Real-Time (RT) Market) in an optimum way to enhance grid reliability and improve economic performance for a network of generation, energy storage, and load resources. The technique strengthens resource health, especially at times when the grid is most constrained and improves resource uptime. The method includes forecasting energy grid conditions, energy market trends, and energy and load resource operational constraints as well as considering regulatory rules to formulate an optimum resource dispatch plan based on market needs and grid requirements.

In various embodiments, the disclosure encompasses the subject matter of the following numbered clauses:

1. A computer-implemented method executed using a global energy management system computer in an energy and load resource network, the energy and load resource network comprising a plurality of energy generating resources, a plurality of load resources, a plurality of energy storage resources, and a plurality of virtual energy resources, the computer-implemented method comprising: receiving a plurality of energy market data and a plurality of capacity market data items; executing an inference stage of a trained machine learning model over the plurality of energy market data and the plurality of capacity market data items to output predictions of generating capacity and load requirements; executing an optimization algorithm over the predictions of generating capacity and load requirements to output a plurality of optimized generating capacity and load requirements; forming a plurality of operational instructions for a plurality of the resources in the energy and load resource network, the plurality of operational instructions being formatted to cause the plurality of the resources in the energy and load resource network to conform to the plurality of optimized generating capacity and load requirements; transmitting the plurality of operational instructions to the plurality of the resources in the energy and load resource network to instruct the plurality of the resources in the energy and load resource network to conform to the plurality of optimized generating capacity and load requirements.

2. The computer-implemented method of clause 1, further comprising, after receiving the plurality of energy market data and a plurality of capacity market data items: creating and storing a long-term forecast of one or more of energy supply, energy demand, resource topology, and market trends; using the long-term forecast, creating and storing a day-ahead forecast of one or more of energy supply, energy demand, resource topology, system conditions, and outages; using the day-ahead forecast, creating and storing a real-time forecast of one or more of change in energy supply, energy demand, system conditions, and outages.

3. The computer-implemented method of clause 2, further comprising executing the optimization algorithm by receiving long-term market data representing one or more of long-term energy prices and ancillary prices, executing a site resource optimization for multiple sites of nodes in the energy and load resource network, multiple resources among the plurality of energy generating resources, the plurality of load resources, the plurality of energy storage resources, and the plurality of virtual energy resources, including site-resource co-optimization, and outputting a site-resource plan.

4. The computer-implemented method of clause 2, further comprising: receiving price forecast data representing one or more of energy prices and ancillary prices; executing a network optimization for multiple energy resource assets, multiple energy markets, and probabilistic price forecasts; outputting a day-ahead plan for use of the multiple energy resource assets.

5. The computer-implemented method of clause 2, further comprising: receiving updated operating plan data representing then-current ancillary services commitments, ancillary service deployment data, stage of charge data, resource limit data, and the real-time forecast; executing a real-time optimizer for the plurality of the resources in the energy and load resource network, the real-time optimizer being programmed to maximize one or more of arbitrage and regulation dispatch revenue against a plurality of constraints comprising meeting day-ahead commitments within resource limits; transmitting the plurality of operational instructions to a plurality of local energy management systems respectively associated with the plurality of the resources in the energy and load resource network; transmitting adjusted telemetry data to a grid regulator.

6. One or more non-transitory computer-readable storage media storing one or more sequences of instructions which, when executed using one or more processors, cause the one or more processors to execute: A computer-implemented method executed using a global energy management system computer in an energy and load resource network, the energy and load resource network comprising a plurality of energy generating resources, a plurality of load resources, a plurality of energy storage resources, and a plurality of virtual energy resources, the computer-implemented method comprising: receiving a plurality of energy market data and a plurality of capacity market data items; executing an inference stage of a trained machine learning model over the plurality of energy market data and the plurality of capacity market data items to output predictions of generating capacity and load requirements; executing an optimization algorithm over the predictions of generating capacity and load requirements to output a plurality of optimized generating capacity and load requirements; forming a plurality of operational instructions for a plurality of the resources in the energy and load resource network, the plurality of operational instructions being formatted to cause the plurality of the resources in the energy and load resource network to conform to the plurality of optimized generating capacity and load requirements; transmitting the plurality of operational instructions to the plurality of the resources in the energy and load resource network to instruct the plurality of the resources in the energy and load resource network to conform to the plurality of optimized generating capacity and load requirements.

7. The one or more non-transitory computer-readable storage media of clause 6, further comprising, after receiving the plurality of energy market data and a plurality of capacity market data items: creating and storing a long-term forecast of one or more of energy supply, energy demand, resource topology, and market trends; using the long-term forecast, creating and storing a day-ahead forecast of one or more of energy supply, energy demand, resource topology, system conditions, and outages; using the day-ahead forecast, creating and storing a real-time forecast of one or more of change in energy supply, energy demand, system conditions, and outages.

8. The one or more non-transitory computer-readable storage media of clause 7, further comprising executing the optimization algorithm by receiving long-term market data representing one or more of long-term energy prices and ancillary prices, executing a site resource optimization for multiple sites of nodes in the energy and load resource network, multiple resources among the plurality of energy generating resources, the plurality of load resources, the plurality of energy storage resources, and the plurality of virtual energy resources, including site-resource co-optimization, and outputting a site-resource plan.

9. The one or more non-transitory computer-readable storage media of clause 7, further comprising: receiving price forecast data representing one or more of energy prices and ancillary prices; executing a network optimization for multiple energy resource assets, multiple energy markets, and probabilistic price forecasts; outputting a day-ahead plan for use of the multiple energy resource assets.

10. The one or more non-transitory computer-readable storage media of clause 7, further comprising: receiving updated operating plan data representing then-current ancillary services commitments, ancillary service deployment data, stage of charge data, resource limit data, and the real-time forecast; executing a real-time optimizer for the plurality of the resources in the energy and load resource network, the real-time optimizer being programmed to maximize one or more of arbitrage and regulation dispatch revenue against a plurality of constraints comprising meeting day-ahead commitments within resource limits; transmitting the plurality of operational instructions to a plurality of local energy management systems respectively associated with the plurality of the resources in the energy and load resource network; transmitting adjusted telemetry data to a grid regulator.

2. Energy and Load Resource Network (ELRN)

In an embodiment, an ELRN is a portfolio of energy generation, energy storage, and load resources (collectively, "Resources") that can be individually controlled and can coordinate with other Resources in the portfolio to optimize all aspects (for example, reliability, operational conditions, risk, regulatory compliance, etc.) of the portfolio to create an efficiently dispatched, reliably operated Resource portfolio. Resources that are distributed in different locations but connected to and capable of communicating with the global Energy Management System (EMS) (for example, a centralized computing system) can form an ELRN. An ELRN comprises four primary types of resources:

A. Generation Resources. Examples include power plants, wind farms, solar farms, geothermal power generation facilities, and hydropower generators.

B. Load Resources, including both Controllable Load Resources and Non-Controllable Load Resources as defined by the Independent System Operator C. Energy Storage Resources (ESR)

D. Virtual Resources, comprising non-physical assets, such as financial transactions or contracts that simulate a resource, other ELRN networks in the same or different ISO territories, and a logical aggregation of smaller Resources that are aggregated into a larger Resource. Digitally stored data structures, database records, and other digital data repositories can store data describing and associating items as virtual resources.

In present energy systems, generation resources can produce energy and supply energy to the grid on demand. Load resources consume energy from the grid and can curtail consumption of energy upon request or dispatch by the grid operator and can be controlled or dispatched by the global or local energy management system (EMS) computer. Load resources include highly flexible loads such as cryptocurrency miners or loads with on-site backup generation. ESRs are unique additions to the electrical grid as they both produce and consume energy. ESRs participate in the energy arbitrage market by consuming energy during lower-value intervals, and storing and delivering energy during higher-value intervals. ESRs also take part in the ancillary service (AS) market which aims to increase grid reliability. Virtual resources include any type of nonphysical asset or structured product that would represent generation or load in a transaction with an energy market. One example could be DA/RT spread trading where energy can be bought/sold in the DA market and sold/bought in the RT market and generate revenue from the spread. A virtual resource does not require any physical asset. However, being a part of the network gives a virtual asset an additional advantage of financial/regulation risk minimization by being backed by physical resources.

The actual resources could be any combination of the four primary Resource types above. There could be many subtypes of Resources such as car batteries or household batteries. A virtual resource may include any type of nonphysical asset which could be any type of market trading, such as any market participation that can be done without directly involving any physical asset. Virtual resources, however, can be backed up by a physical resource.

To form an ELRN, different types of Resources are connected to a global EMS. Some Resources could be distributed, while other Resources could be collocated. For example, a generation resource in west Texas, a load in south Texas, and an ESR in central Texas can form a network if they are connected and operated through a global EMS. Also, a collocated ESR with renewable solar or wind generation in West Texas can join the same network. There are some advantages of certain collocated resources that could share energy between them and better optimize the revenue. However, to be part of the network and operated as a network, collocation is not necessary.

FIG. 1 illustrates a method and system of combining different capacity and energy market products in one embodiment. A distributed ELRN 100 can comprise, in one embodiment, an energy market data repository 102 that is programmed to store a plurality of tables or files storing digital data representing one or more energy markets, day-ahead (DA) forecasts concerning energy supplies, real-time (RT) forecasts of supply, and DA-RT spread or difference calculations. The ELRN 100 can further comprise a capacity market data repository 104 that is programmed to store a plurality of tables or files storing digital data representing one or more capacity or load markets, adder data, and data describing one or more ancillary services that also act on the demand side of energy systems.

In an embodiment, a computer system comprising at least a machine learning model 106 and dispatch instructions 108 are programmed to periodically poll, call, read, or otherwise obtain data from the energy market data repository 102 and the capacity market data repository 104. The data received from the energy market data repository 102 and the capacity market data repository 104 can be used in a training stage to train the machine learning model 106. After training, the machine learning model 106 can be executed in the inference stage to output predictions of energy supply and energy capacity. As further described in other sections, the output predictions can be refined or modified using one or more optimization algorithms and transformed into a set of dispatch instructions 108, which are transmitted to Resource 1, Resource 2, and any number of other resources denoted Resource N.

The foregoing method yields an end-to-end autonomous system for an energy and load resource network that can execute all processing from site selection to settlement autonomously. The method includes forecasting energy grid conditions and energy market trends for long, medium, and short terms as a backbone of the autonomous system. For example, site selection may heavily depend on long-term (for example, years ahead) forecasting of market trends and grid conditions whereas daily operation would require short-term (for example, a day ahead or an hour ahead) forecasting.

Figure 2:
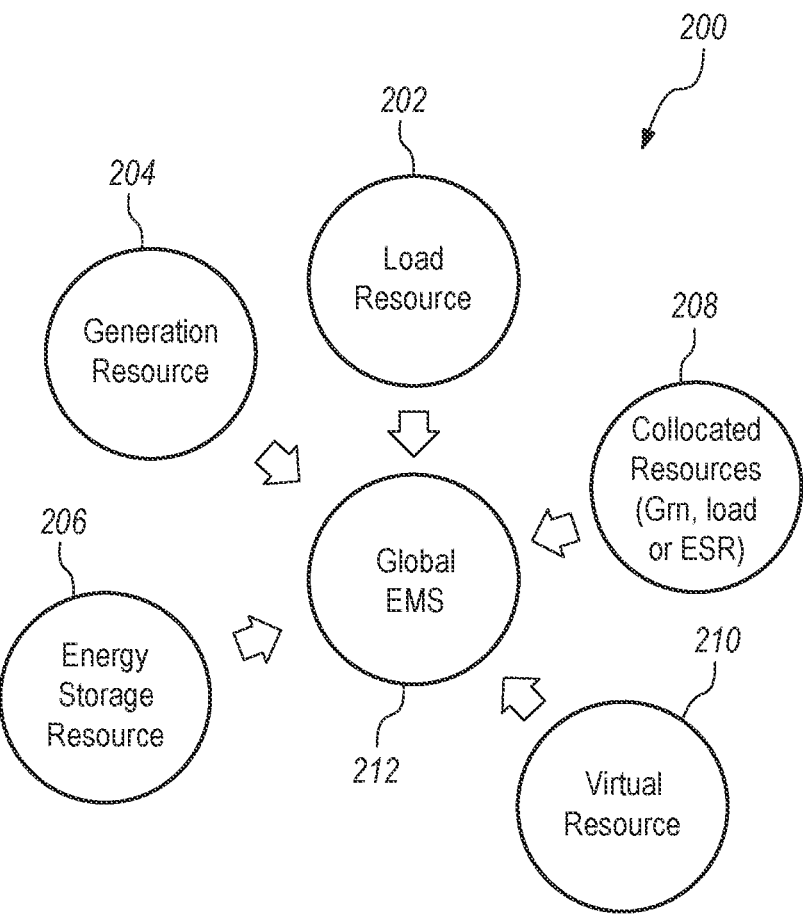
FIG. 2 is a diagram illustrating an Energy and Load Resource Network (ELRN), according to particular embodiments.

FIG. 2 illustrates an example ELRN. In some embodiments, the functional elements shown in FIG. 2 may be termed a trader Max network. In an embodiment, a traDER Max network 200 comprises generation resources 204, load resources 202, ESRs 206, collocated resources 208, and virtual resources 210 (collectively, the "Resources"), and can be operated using a global energy management system computer or global EMS computer 212. The EMS computer 212 is programmed for managing and operating the Resources as a network, as opposed to individual Resources. To do so, EMS computer 212 is programmed, in one embodiment, to execute one or more network optimization algorithms to optimize the use of generation and load resources across all resources of the ELRN. While connected to the trader Max network 200, the global EMS 212 is programmed to continuously execute a network optimization algorithm in real time and decides where, when, and how much energy to transfer or dispatch from each of the Resources 202, 204, 206, 208, 210 to enhance efficient operation, ensure regulatory compliance, maintain reliability and maximize the total network revenue.

The introduction of universal network optimization in this manner creates substantial benefits for Resources 202, 204, 206, 208, 210 and for the electric grid. It creates improved reliability, increased operational uptime with optimized periods for maintenance, enhanced communication with the grid operator, improved regulatory compliance, and efficient dispatch and coordination. The ELRN minimizes risk by evaluating operational constraints, Resource outages, Resource health, electric grid constraints, and the need for energy in certain locations within the grid in real-time and redistributing obligations and energy dispatch through real-time network optimization.

3. Long-Term Forecast, Network Optimization, and Operation (Site/Resource Optimization)

Figure 3A:
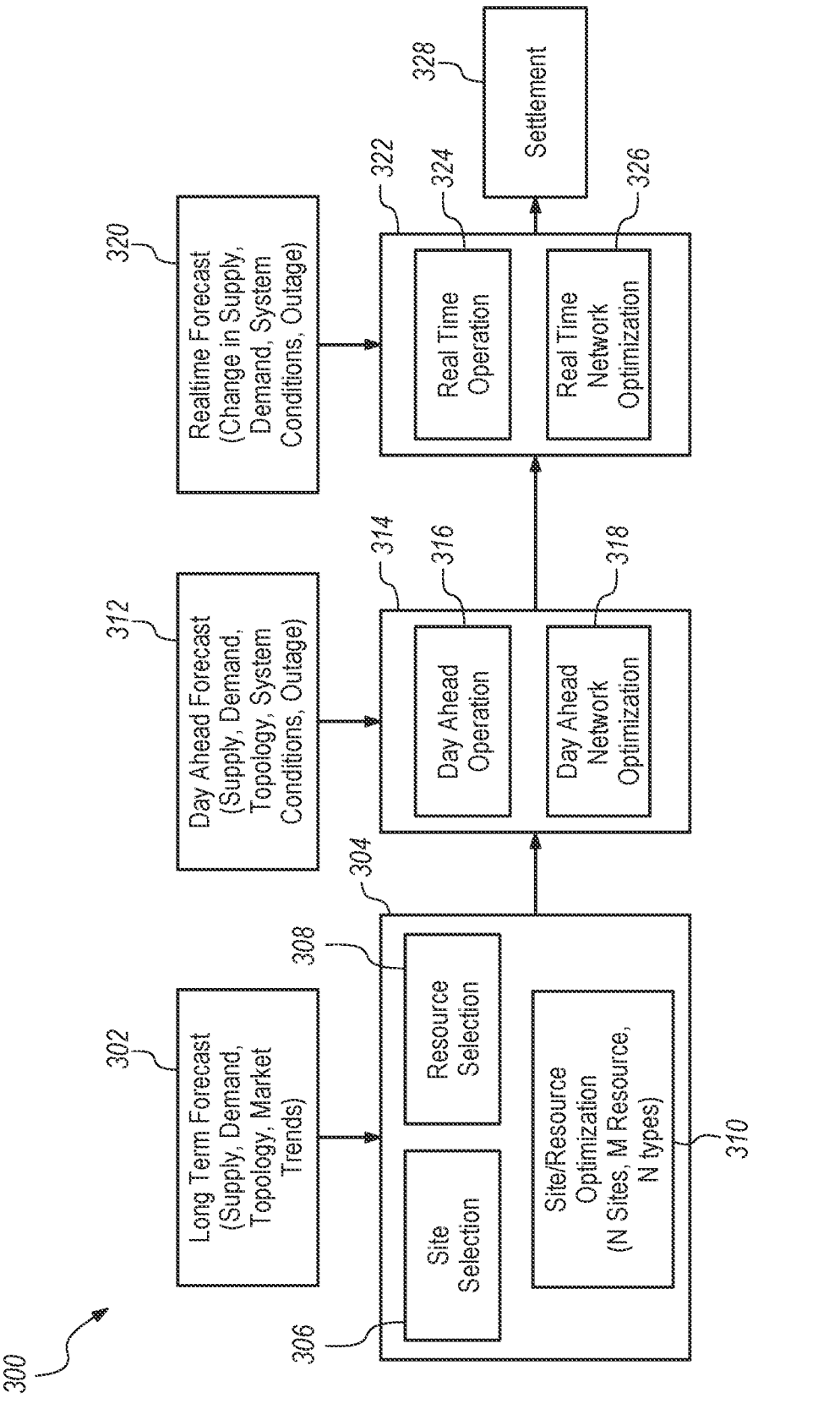
FIG. 3A is a diagram illustrating a method and system of multistage network optimization and operation, according to particular embodiments.
Figure 3B:
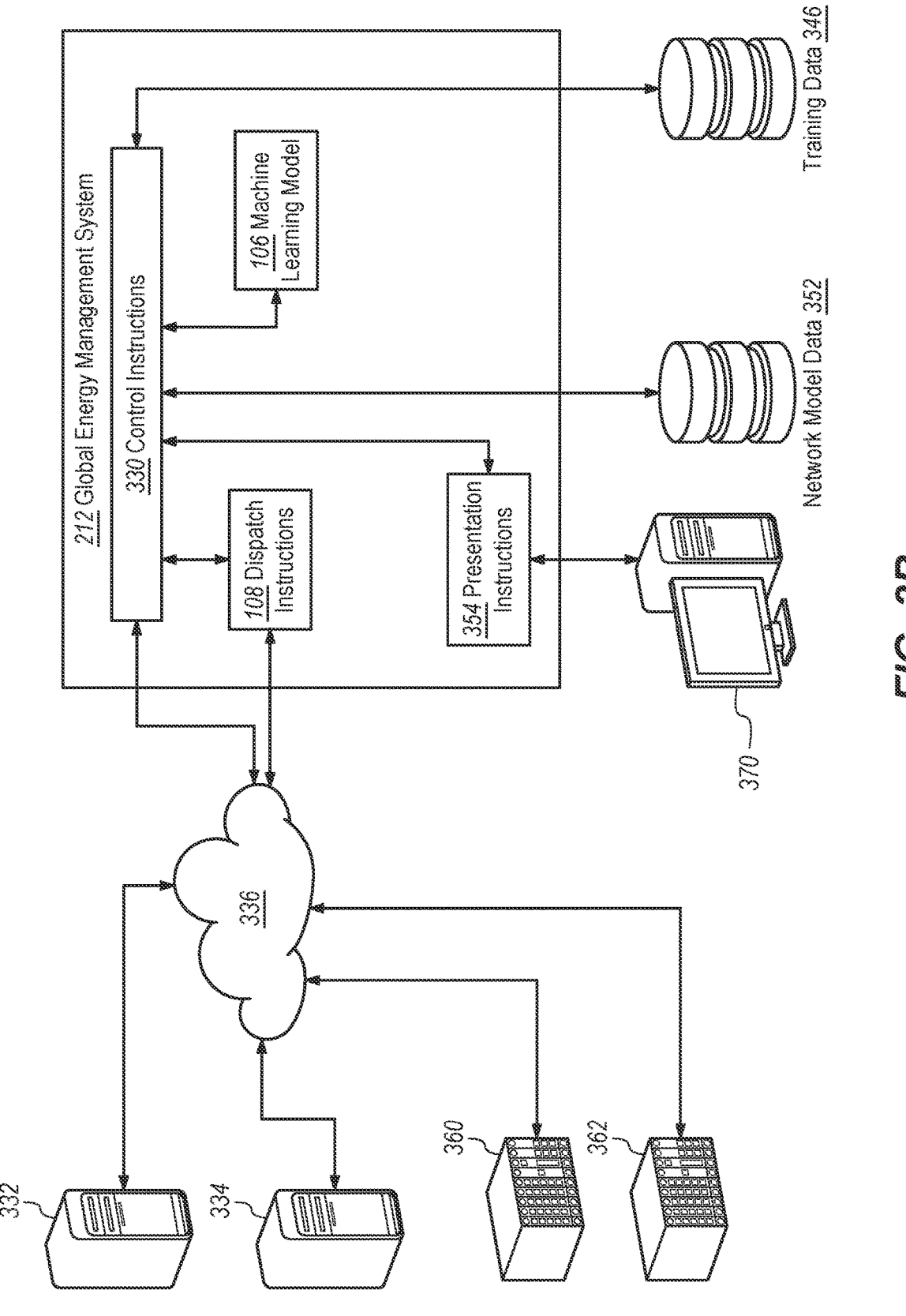
FIG. 3B illustrates an example of a distributed computer system with which an embodiment could be implemented.

FIG. 3A illustrates a method and system of multistage network optimization and operation. FIG. 3B illustrates a distributed computer system with which certain embodiments can be implemented. In an embodiment, a global EMS computer 312 comprises components implemented partially by hardware at one or more computing devices, such as one or more hardware processors executing stored program instructions stored in one or more memories for performing the functions described herein. In other words, all functions described herein are intended to indicate operations performed using programming in a special or general-purpose computer in various embodiments. FIG. 3A, FIG. 3B illustrate only one of many possible arrangements of components configured to execute the programming described herein. Other arrangements may include fewer or different components, and the division of work between the components may vary depending on the arrangement.

Each diagram of a process, computer program flow, or data flow between functional elements of a distributed system in this disclosure is intended as an illustration of the functional level at which skilled persons, in the art to which this disclosure pertains, communicate with one another in order to describe and implement a computer-implemented method, as described further herein and/or algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

FIG. 3A, FIG. 3B, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of providing an end-to-end autonomous system for an energy and load resource network that can execute all processing from site selection to settlement autonomously. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

Referring first to FIG. 3A, in one embodiment, the global EMS computer 212 (FIG. 2) can execute a set of control instructions 300 that are organized as a plurality of methods, functions, or routines represented in the drawing figure as rectangles. In an embodiment, long-term forecasting instructions 302 are programmed for forecasting prices of different market products years ahead (for example, year-ahead energy prices, adders, and ancillary clearing prices). In some embodiments, the disclosed methods rely on a variety of inputs that are made available from multiple external sources (for example, various weather forecast data, load forecast data, topology forecast data, generation forecast data, etc.) as well as forecasted market conditions data created by in-house machine learning algorithms. Inputs are fed into a Security Constrained Economic Dispatch (SCED) that produces price forecasts and constraints encompassing all nodes in the topology.

Forecasted prices are then fed to a Site/Resource optimization suite 304 to create an optimal Site/Resource plan to be added to the network. In an embodiment, Site/Resource optimization suite 304 comprises site selection instructions 306, resource selection instructions 308, and a site/resource optimization algorithm 310 that is programmed to form an optimal set of N sites and M resources.

Referring now to FIG. 3B, in one embodiment, the global EMS 212 (FIG. 2) is communicatively coupled, directly or indirectly, via one or more networks 336 to two or more networked server computers 332, 334, two or more local EMS computers 360, 362, an administrator computer 370, a network model data repository 352, and a training data repository 346. Each of the networked server computers 332, 334 hosts or executes applications, or manages data, that the global EMS 212 can access and read programmatically using API calls, parameterized HTTP calls, or proprietary calls, polls, or requests, to obtain data relating to energy market conditions and capacity market conditions, including but not limited to long-term energy prices, day-ahead and real-time nodal and system energy prices, ancillary prices, operating plans or ancillary services commitments, state of charge, and resource limits. Each of the networked server computers 332, 334 can be associated with a node of an ELRN, a site, or an independent market analysis entity.

In an embodiment, each of the two or more local EMS computers 360, 362 is associated with a node of an ELRN, or a site. Each local EMS computer 360, 362 is programmed to programmatically receive instructions that the global EMS 212 dispatches under program control as further described in other sections. The instructions can be formatted to instruct or control a plurality of the resources in the ELRN, to cause the plurality of the resources in the energy and load resource network to conform to optimized generating capacity and load requirements, as further described.

Network 336 broadly represents any combination of data telecommunication networks including, for example, one or more packet-switched local area networks, wide area networks, campus networks, internetworks, or a combination of any of the foregoing; the public Internet can be an element of the network.

In an embodiment, global EMS 212 hosts or executes control instructions 330, the machine learning model 106, and presentation instructions 354, and is programmed to form or format and dispatch sets of instructions 108 to the local EMS computers 360, 362. The control instructions 330 can be programmed to execute the functions that are described in other sections corresponding to FIG. 3A, FIG. 4, FIG. 5, FIG. 6, and FIG. 7. The presentation instructions 354 can be formatted to cause displaying, at the administrator computer 370, a graphical user interface, command-line interface, or other human-computer interface to display the output data specified in other sections.

Figure 8:
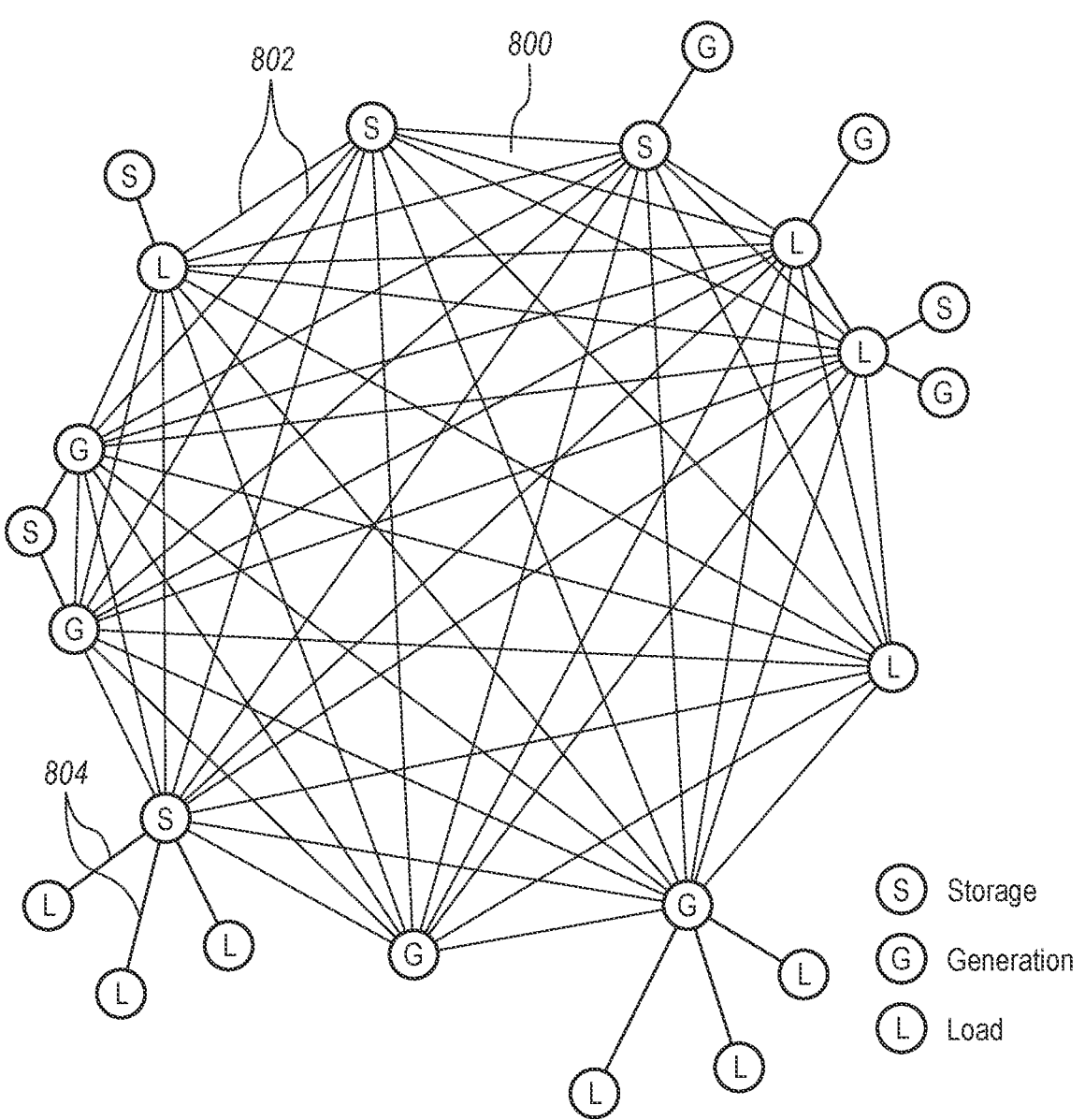
FIG. 8, FIG. 9 are diagrams illustrating a Distributed Energy Resource (DER) Network, according to particular embodiments.
Figure 9:
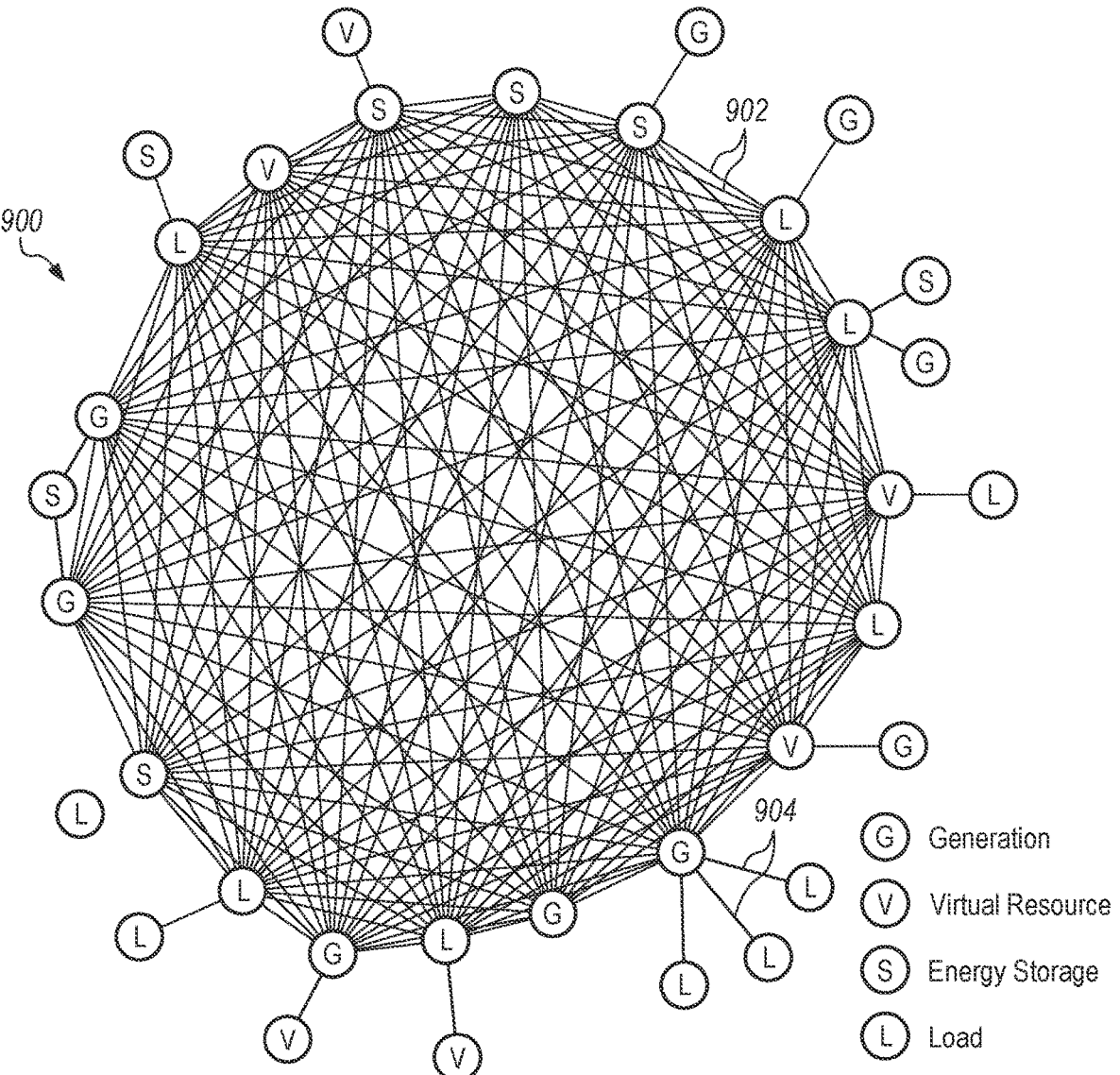

In an embodiment, network model data repository 352 digitally stores a network model including one or more data sets from among topology data, network node data, and/or market data sufficient to describe an ELRN. The network model data repository 352 can be pre-populated with data describing the sites, nodes, and resources in an ELRN to support the execution of the optimization algorithms as further described. Further, in an embodiment, control instructions 330 can be programmed to read the data describing the sites, nodes, and resources in an ELRN and to create and store, in the main memory of the global EMS 212, a network model comprising nodes and edges in the form that is visualized in FIG. 8 and FIG. 9. As further described in other sections, FIG. 8 and FIG. 9 represent visualizations of ELRNs that can be represented in computer memory by node identifiers and edges, where each of the edges is characterized by a first node and a second node that the edge joins. In this manner, global EMS 212 is programmed to form an in-memory model of an ELRN comprising a plurality of energy generating resources, a plurality of load resources, a plurality of energy storage resources, and a plurality of virtual energy resources. The in-memory model can be the basis of the execution of optimization algorithms, data transformations, forecasts, plans and dispatch instructions, as further described.

In an embodiment, training data 346 digitally stores a corpus of training data that can be read during the execution of a training stage of the machine learning model 106. Training data can represent historic energy market data and historic capacity market data, using any of the metrics and values that have been described in other sections.

FIG. 4 illustrates the basic functionality of the traDER Max Long term Forecast and Site/Resource Optimization. The functions of FIG. 4 can be programmed to implement the long-term forecast instructions 302 and site/resource optimization algorithm 310. In an embodiment, a long-term forecast system 400 for implementing the long-term forecast instructions 302 comprise forming long-term market data 402, for example, by accessing a data repository of historic energy prices and extrapolating those prices, with bias or forecast gradient changes specified in other data, to create and store long-term energy prices and ancillary prices for years ahead.

Further, system 400 can be programmed to execute a site resource optimization 404, with a first operation to read, obtain, or retrieve the long-term market data 402. Next, a short list of potential sites is created from all possible distribution nodes; in an embodiment, a database accessible to the EMS computer 212 can store tables describing available or known distribution nodes. The site resource optimization 404 is programmed to execute an evaluation of constraints in the electric grid and identification of locations where additional Resources are needed, as well as revenue and opportunity estimation in all possible sites using long-term market fundamental forecast. Future arbitrage (Arb) opportunity, future Arb-Ancillary opportunity (where different markets are optimized), risk/reward, and several other factors may contribute to the site selection process.

As a result, the site resource optimization 404 is programmed to output a plan 406. In various embodiments, plan 406 can specify an optimal site, resource type, mapping, or other plans for different geographically located resources. The site resource optimization 404 can be programmed to create an optimal site/resource plan/mapping based on network revenue estimation and maximization in all different markets. Plan 406 comprises, in one embodiment, output data from the optimization instructions 404 comprising one or more plans, maps, or types, digitally stored in one or more database tables, for sites and resources.

Other functions and methods of the site/resource optimization suite 304 can include, in one embodiment:

A. Co-location opportunities-Co-location of two or more Energy Resources within the network B. Feasibility Analysis-Operational Aspects, Infrastructure cost optimization C. Diversity/Risk assessment-diversity of nodes/resources D. Sub-network mapping-Strategic resource integration in sub-networks By utilizing the consistent long-term market forecast and considering various operational limitations, a compilation of potential resource types and their respective locations is produced. This includes options such as individual ESRs, standalone power generation, and individual loads, as well as combinations like co-located ESRs with solar or wind generation, and virtual resources. Unlike typical systems, embodiments of the disclosure select/determine sites based on network revenue (i.e., not just individual site revenue) based on multiple geographic locations in the network.

As shown in FIG. 4, instead of doing DA forecasts or RT forecasts, embodiments perform long-time forecasts for site resource optimization. For example, in 2022, embodiments try to predict different market prices for 2025, 2026, 2027 in the next five years. The prices could be similar, such as DA, RT, no low price, system manager prices, ancillary prices, or any kind of market trends. From there, site resource optimization is performed as illustrated. While current methods may generate a forecast on one single site, the disclosed embodiments generate a plan over multiple sites and pick the sites based on the revenue from the network, not just from the individual resource. In other words, the disclosed embodiments design the system based on how the integrated system is going to work instead of just how one plant performs.

4. Day Ahead Forecast, Network Optimization, and Operation (Day Ahead Predictive Optimization and Operation)

Referring again to FIG. 3A, in an embodiment, the control instructions 300 further comprise DA forecast instruction 312, which can interoperate with a DA predictive optimizer suite 314 having DA operation instructions 316 and DA network optimization instructions 318. Day ahead predictive optimization is a two-step process focused on creating bids and offers for different market services in the DA market. The first step includes price forecasting and the latter includes optimization.

Figure 5:
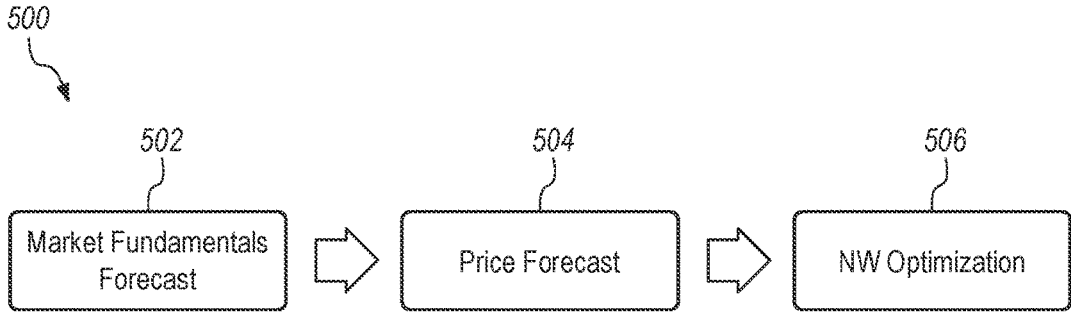
FIG. 5 is a diagram illustrating traDER Max Day Ahead Predictive Optimization and Operation, according to particular embodiments.

FIG. 5 illustrates an example of traDER Max Day Ahead Predictive Optimization and Operation. In a forecast flow 500 as part of the DA predictive optimizer suite 314, a market fundamentals forecast at block 502 can be analyzed to yield a price forecast at block 504, followed at block 506 by network optimization. Price forecasting at block 504 includes forecasting prices of different market products during the day ahead of real-time power flows (for example, DA energy prices, RT energy prices, energy adders, and ancillary service clearing prices). This forecast is made available before the day ahead market closes. The disclosed embodiments utilize different methods to accomplish these tasks. In some embodiments, the methods utilized to accomplish these tasks rely on a variety of inputs that are made available from multiple external sources (for example, various weather forecast data, load forecast data from vendors, etc.) as well as forecasted market conditions data created by machine learning algorithms. Example methods include:

A. FORECASTING USING SECURITY CONSTRAINED ECONOMIC DISPATCH (SCED): SCED incorporates a representation of the physical composition of a power market (topology, generators, generator characteristics, load, market rules, and constraints) simulates grid operations and creates price forecasts. Varying loads, wind, solar, generator outages, and topologies produce different scenarios thus creating multiple sets of price forecasts.

B. MACHINE LEARNING MODELS: Under this framework, classifiers like k-Nearest Neighbors (kNN) can be used to identify historical analogs for the forecast period (indexed by load, wind, solar, fuel, and generator outage profiles) and the market prices associated with the analogs are used as forecasts.

Forecasted prices are then fed to the optimization suite 304 to create optimal bids and offers. The DA optimization suite 314 is programmed to consider an Energy Resource's operational aspects and designs bids accordingly.

Figure 6:
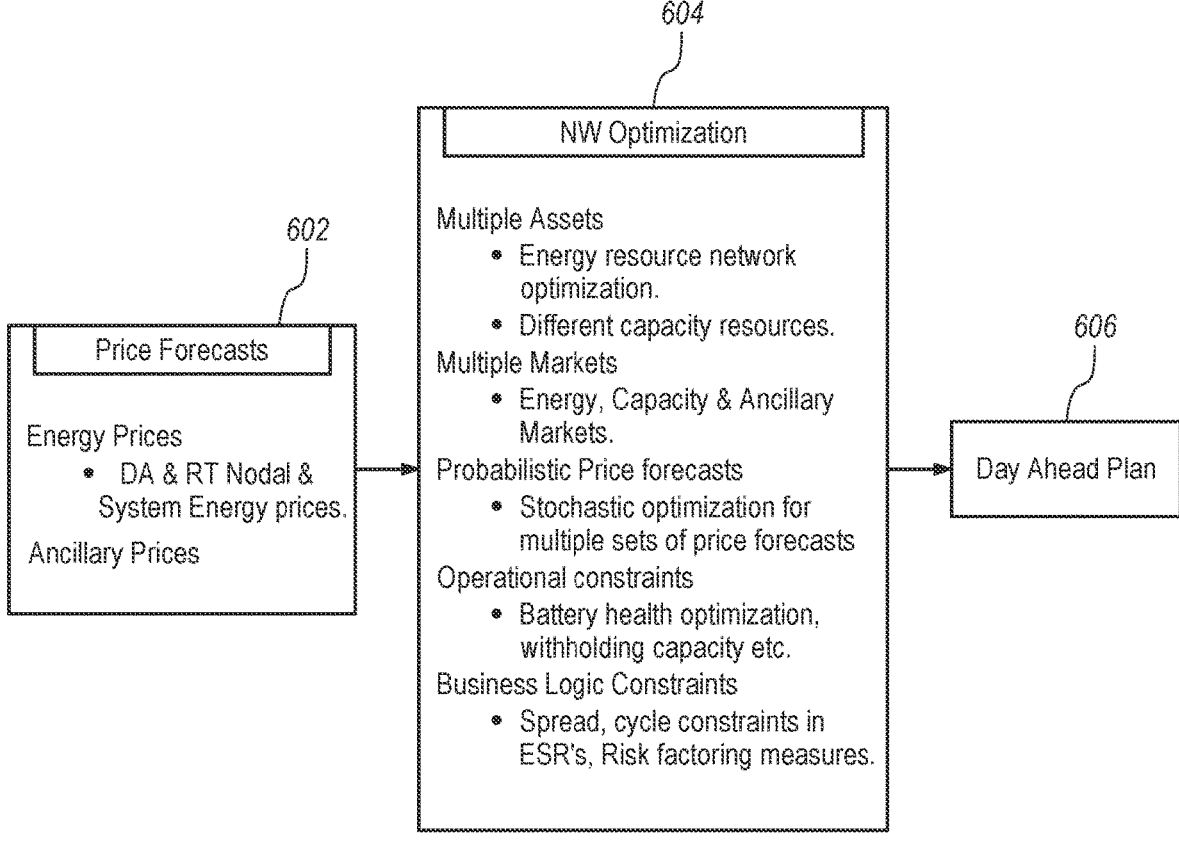
FIG. 6 is another diagram illustrating traDER Max Day Ahead Predictive Optimization and Operation, according to particular embodiments.

FIG. 6 illustrates the basic functionality of the traDER Max Day Ahead predictive optimizer. The elements of FIG. 6 can be programmed as part of the DA predictive optimizer suite 314. In an embodiment, DA optimization suite 314 receives price forecast 602 as one input. The price forecasts 602 can comprise DA and RT nodal and system energy prices, and/or ancillary prices. In an embodiment, DA predictive optimizer suite 314 also is programmed to execute:

A. NETWORK OPTIMIZATION: A network optimization 604 is programmed to optimize multiple assets at once by treating them as a network and creating bids and offers collectively, outputting a DA plan 606. This approach helps create better performance and revenue realization compared to assets optimized individually.

B. FLEXIBILITY IN CHOOSING MARKET PRODUCTS: The network optimization 604 is programmed to create bids and offers in the day ahead market for any combination of market products, including RT arbitrage, DAM Energy, Energy Adders, and ancillary services. Thus, it allows flexibility to pick and choose combinations of products that benefit the grid and the market participant.

C. HANDLE PROBABILISTIC PRICE FORECASTS: The network optimization 604 is programmed to handle multiple sets of price forecasts through stochastic optimization techniques.

D. IMPOSE OPERATIONAL CONSTRAINS ON ASSETS: The network optimization 604 is programmed to allow a market participant to customize the bids and offers by allowing them to impose asset operational limits such as battery health optimization, regulatory requirements, or limitation on operation, optimal maintenance scheduling, etc.

E. CONSTRUCT BUSINESS LOGIC IN BIDS AND OFFERS: Business logic-related decisions are built into the network optimization 604.

5. Real-Time Forecast, Network Optimization, and Operation (Real-Time Predictive Optimization and Operation)

Referring again to FIG. 3A, in an embodiment, the control instructions 300 further comprise real-time forecast instructions 320, which are programmed to continuously determine changes in supply, demand, system conditions, and outages, and to generate instructions to Resources to modify the use of the Resources. In an embodiment, real-time forecast instructions 320 interoperate with an RT predictive optimizer suite 322 comprising RT operation instructions 324 and RT network instructions 326. Output from real-time forecast instructions 320 comprises instructions for settlement 328, which can include Resource use instructions that are formatted to be programmatically transmitted to Resources for direct or indirect control of the Resources.

FIG. 7 illustrates the basic functionality of the traDER Max RT predictive optimizer suite, in one embodiment. In the example of FIG. 7, in a real-time optimization 700, the global EMS computer 312 communicates with field remote terminal units (RTUs) to acquire state of energy (SoE), resource limits associated with sustaining resources, and ESRs stack information, as shown by block 708. The global EMS computer 312 acquires AS deployment signals 706, AS commitment capacities, and the then-current most updated operating plans with its grid regulator, as shown in block 704. The global EMS computer 312 is programmed to collect forecasted real-time energy prices, online reliability prices, and regulation signals, as shown by block 710.

As part of the predictive optimizer suite 322, the global EMS computer 312 executes a real-time optimizer algorithm 702 at a frequency sufficient to respond to real-time energy price changes based on the abovementioned data. The real-time optimizer algorithm 702 is programmed to maximize revenues while maintaining reliability, respecting operational limits, and complying with all grid operator rules and requirements. The real-time optimizer algorithm 702 is bounded by the constraints to meet day-ahead AS commitment, ensure deployment commitment, and stay within resource limitations. The real-time optimizer algorithm 702 also is programmed to limit ESR cycles through penalty function methods.

The real-time optimizer algorithm 702 is programmed to determine one or more sets of regulatory dispatch instructions 712 and then sends the instructions to the corresponding RTUs and/or local EMS computers. The real-time optimizer algorithm 702 is programmed to determine adjusted telemetry data 714 associated with the AS commitments. In one embodiment, the real-time optimizer algorithm 702 is programmed to transmit one or more energy offers 716 to facilitate energy arbitrage and to protect AS capacity. In this manner, real-time optimizer algorithm 702 optimizer is programmed to maximize portfolio revenue while maintaining reliability and compliance and to send optimum dispatch instructions to the ESRs of Resources. The real-time optimizer algorithm 702 also is programmed to ensure compliance with the grid regulator by sending adjusted telemetries and meeting AS deployments.

In various embodiments, real-time optimizer algorithm 702 can be programmed to implement one or more of:

A. ENHANCE GRID PERFORMANCE AND RELIABILITY. The real-time optimizer algorithm 702 improves the performance and reliability of the grid by either supplying energy or reducing load. It achieves this by prioritizing locations where energy is in higher demand or more critically needed. The methodology boosts portfolio revenue inherently.

B. CYCLE REDUCTION TO INCREASE ESR LONGEVITY. The real-time optimizer algorithm 702 is programmed to use a penalty function to limit an ESR's charge/discharge cycle to maintain battery health and increase the longevity of the ESRs. The optimizer cycle limit is adjustable and customizable at the individual ESR levels.

C. DETERMINES OPTIMUM DISPATCH (CHARGING/DISCHARGING). The real-time optimizer algorithm 702 is programmed to calculate the optimum dispatch (charging and discharging) for all ESRs within the portfolio. The RT optimizer algorithm 702 is programmed to send the dispatch instructions to the field RTU. The primary frequency response is handled by the local RTU.

D. HANDLE TELEMETRIES TO FULFILL DAY-AHEAD AS RESPONSIBILITY. The real-time optimizer algorithm 702 is programmed to handle all real-time telemetries to operate the Resources in real time. real-time optimizer algorithm 702 is programmed to fulfill day-ahead AS commitments by telemetering adjusted responsibility. The adjustment in the telemetries helps Resources to operate within their sustain limits. The AS responsibilities are assigned to the suitable Resources to facilitate strategic charging and discharging for ESRs, efficient Resource maintenance, maintenance of reliability, fulfilling compliance requirements, and maximizing revenue.

E. TRIGGER REAL-TIME ENERGY OFFER. As the real-time optimizer algorithm 702 moves AS responsibilities across the Resources, it triggers real-time energy offers to facilitate energy offers and to protect AS capacities.

F. HANDLE REAL-TIME OUTAGES, AND CAPACITY DEGRADATION. The real-time optimizer algorithm 702 can handle any real-time Resource outages and capacity degradation instantaneously. The real-time optimizer algorithm 702 is programmed to lower or eliminate AS responsibilities from the affected Resources by moving responsibility to the available Resources within the portfolio. This creates a more reliable portfolio for the grid operator.

G. REDUCE RISK BY SHARING CAPACITY ACROSS ALL RESOURCES. The real-time optimizer algorithm 702 reduces the risk of non-compliance by sharing capacity across all Resources within the network.

6. Private Use Network or Microgrid with on-Site Resource Optimization and Operation In various embodiments, the techniques that have been previously described can be applied in private energy networks, on-site generation systems, and microgrids that operate independently from a general-purpose, wide-area utility grid. For example, a PUN can operate as a generation resource or as a load resource, and an embodiment could be used to optimize the interaction of the PUN with the electric grid or to optimize the operation of the PUN, independent of the electric grid.

FIG. 8, FIG. 9 are diagrams illustrating a Distributed Energy Resource (DER) Network, according to particular embodiments. Referring first to FIG. 8, as a hypothetical example, a DER 800 comprises a plurality of nodes G, L, S corresponding to generation facilities, load resources, and storage resources. Nodes G, L, S are communicatively coupled via a plurality of network data communication paths 802. In some instances, terminal nodes such as L nodes are coupled to another node of the network on spoke paths 804 that do not form a mesh with paths 802. FIG. 9 represents a similar DER network 900 that additionally includes nodes V for virtual resources. As with network 800, the DER network 900 comprises a plurality of mesh networked data communication paths 902 between nodes. Selected nodes have single spoke paths 904 that couple the nodes to other nodes.

Nodes coupled in the mesh via paths 802, 902 interact with one another in the DER networks 800, 900, or are collocated. Nodes coupled by spoke paths 804, 904 represent standalone resources or devices. In some embodiments, the interaction nodes may be through price diversification or shifting of responsibilities for reliability or compliance. For example, if the pricing for using the storage nodes of the top left portion of FIG. 8 is higher than the pricing for generation at the bottom in those nodes, certain embodiments would create a different revenue stream for the Resource nodes at the bottom while ensuring that the top Resource nodes are participating in the higher pricing. In other words, certain embodiments would utilize LMP pricing and arbitrage at the top nodes and would maximize the price for the bottom nodes. This would not be possible if the nodes were not interacting with each other. This results in nodes backing up other nodes in the network. In this case, all nodes are aware of each other and know each other's state of charge, operational limitations, and other current physical or compliance metrics.

In some embodiments, the networks of FIG. 8, FIG. 9 may include the global EMS computer 312, which is capable of communication with any of the nodes in the network using programmatic calls, API calls, parameterized HTTP messages, or energy network-specific protocols. As previously described, the global EMS computer 312 may be any appropriate computer system with a processor and memory that contains stored program logic or software code that is programmed to perform the functions described herein.

Embodiments can be used in a variety of special-purpose applications. For example, an electric car, truck, or other vehicle (EV) or an industrial uninterruptible power supply (UPS) can act individually like a battery, and in a networked aggregate, can stabilize the grid and provide a source of power at the lowest cost when charging. Furthermore, a load of a noisy industrial application, such as an industrial-scale UPS, or the variation of the number of EVs looking to charge at a node can be normalized and mitigated to optimize for the grid and economics.

In some embodiments, the disclosed embodiments provide EV bidirectional grid connections where billing and risk profiles may be leveraged into different business models. For example, a particular customer may be willing to let their EV be drained by the grid in an ice storm only at a certain payoff rate or only until they have one day of reserve for their own house. Embodiments may be programmed to use a gradual risk/reward profile; the profile could impact the ability to pay for the use of the EV power at certain times or could be tied to some amount of free power in the future to charge on the network.

In some embodiments, if a particular customer has more than one EV, the charge or discharge of the EV may be distributed equally or prioritized. In one embodiment, prioritization is based on personal preference or practical limitations. For example, in the winter or dynamically based on digitally-available road conditions, a four-wheel drive EV might be prioritized to maintain a full charge while an electric motorcycle might be allowed to fully deplete. As another example, if a customer has a single driveway for their house and GPS data indicates that multiple EVs are double-parked in the driveway, the EV closest to the road may be prevented from being discharged to the point that the other EV is unable to get out.

The charge/discharge prioritization rules for an EV may also follow the vehicle using geolocation information, such as GPS coordinates, of the EV provided by cellular or other means, or by way of identification at a charge terminal. For example, if an EV is plugged into a charger at a shopping mall, the discharge of the EV may be limited to some function of the distance to the owner's home, for example, mileage plus 30%. In some embodiments, the power draw or timing of the draw of the EV may be required to be approved by the owner, for example, from a smartphone app. For example, if the owner of the EV is walking into a movie theater, the owner may approve having the charge of the EV drawn on or discharged to the grid as long as the EV is recharged sufficiently by the time the owner needs to go home three hours later. In this scenario, the owner of the EV could approve via a mobile application or could set the time for next use.

In some embodiments, the owner of an EV may be presented with one or more options to control the number of charge/discharge cycles for which an EV is allowed to be used. Control over the number of charge/discharge cycles can be useful because rapid charge/discharge cycling may have a negative impact on the EV. In some embodiments, these options may be correlated to a level of service package purchased by the owner and/or a rate for the power in either direction.

In some embodiments, an owner of an EV may be presented with an emergency charge mode option that is more expensive but charges the EV quickly. For example, consider a scenario where an EV owner has signed up for the grid to use their EV's charge with priority but receives an emergency call that requires immediate use of the EV. The owner may select the option to emergency charge the EV in order to quickly charge the EV and regain use of the EV.

Figure 10:
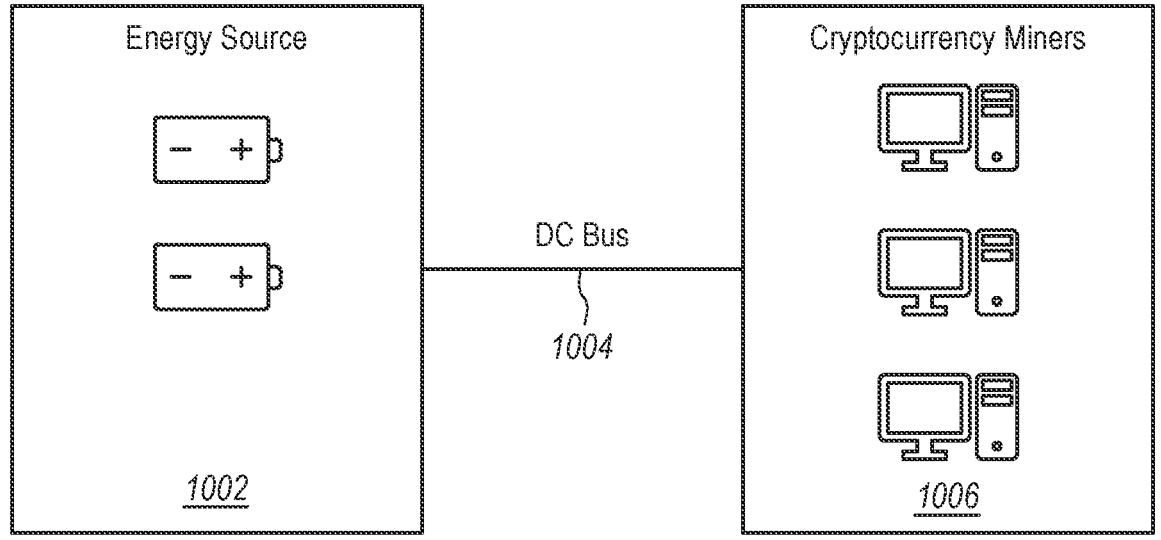
FIG. 10 is a diagram illustrating the allocation of power on a DC bus to cryptocurrency miners, according to particular embodiments.

FIG. 10 is a diagram illustrating the allocation of power on a DC bus to cryptocurrency miners, according to particular embodiments. In this embodiment, a Resource (for example, a DC energy source such as a battery or bank of batteries, solar panel(s), geothermal generator(s), etc.) is in close proximity (for example, within one thousand feet) to one or more cryptocurrency miners (for example, one or more cryptocurrency computing systems). The cryptocurrency miners are powered by a DC bus (for example, 3.3 volts, 5 volts, 12 volts, etc.) that is coupled directly to and powered directly by the energy source. The system of FIG. 10 contrasts with typical cryptocurrency mining systems where AC power from the grid is converted to DC power that is used to power the cryptocurrency mining systems. By avoiding having to convert AC power to DC power, the system of FIG. 10 is able to avoid the power losses that are typically associated with converting AC to DC power. Furthermore, heat generation that is typically associated with converting AC to DC power may be avoided, which further reduces energy consumption (for example, for air conditioning).

In general, the DC bus connection between the energy source and the cryptocurrency miners may be controlled by the economics, weather conditions, time-shift requirements, methods, etc. that are described above. For example, if a major freeze/ice/snow event occurs in a geographic area that affects power generation, the power on the DC bus to the cryptocurrency miners may be disabled or reduced until power conditions on the grid improve. Furthermore, the cryptocurrency miners may be presented with an option to pay less for consuming power from the DC bus in order to be a lower-priority power consumer. As another example, the cryptocurrency miners may be powered during the day primarily by solar, and at nighttime may be powered primarily by battery. In sum, the power on the DC bus may be controlled (for example, time shifting and enabling different levels of operation based on loads and pricing) in order to meet the quality of service guarantees with the cryptocurrency miners.

In some embodiments, an energy source as described herein may be coupled to a vehicle charging station via a controlled DC bus. For example, an ESR (for example, a battery module) may be placed in a parking lot or a highway rest stop and then coupled to a vehicle charging station via a DC bus. Drivers may plug in their electric vehicles and perform high-speed charging using the DC bus during typical driving times and the battery module may be charged via the grid at night.

In some embodiments, an energy source as described herein may be coupled to an interchangeable battery charging station via a controlled DC bus. For example, an ESR (for example, a battery module) may be placed on a public sidewalk and then coupled to an interchangeable battery charging station on a DC bus. Users may plug in their interchangeable batteries (for example, for electric scooters) and perform high-speed charging using the DC bus. As another example, an ESR may be placed on a golf course and then coupled to a golf cart charging station via a DC bus. Golf carts (or their batteries) may be plugged into the charging station for high-speed charging using the DC bus. As another example, an ESR may be placed at a marina and then coupled to a boat charging station via a DC bus. Electric boats (or their batteries) may be plugged into the charging station for high-speed charging using the DC bus. As yet another example, an ESR may be placed at an airport and then coupled to an airplane charging station via a DC bus. Electric aircraft (or their batteries) may be plugged into the charging station for high-speed charging using the DC bus. In all of these scenarios, the methods described above may be used to control the charging and discharging of the ESR.

7. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 11:
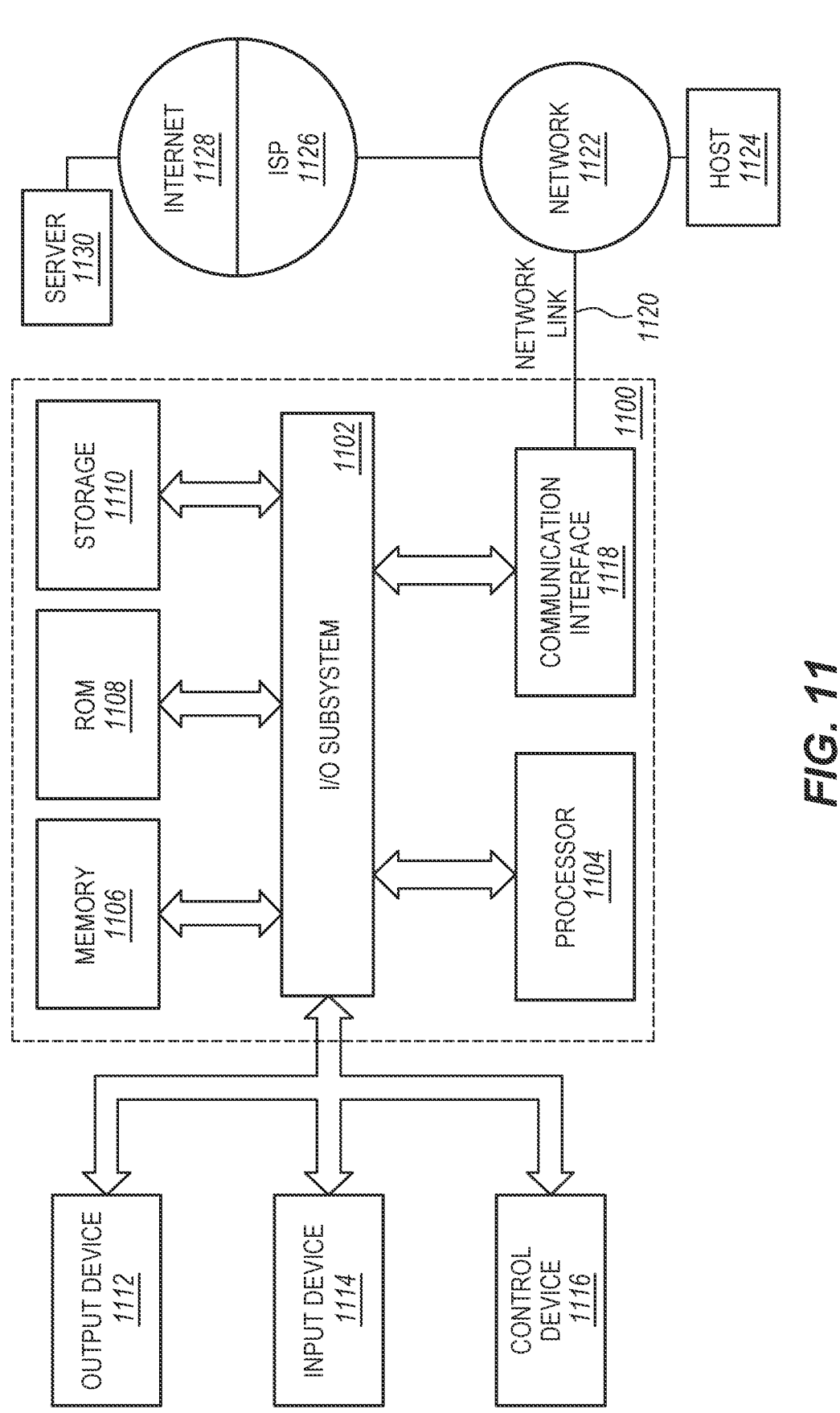
FIG. 11 is a block diagram that illustrates an example computer system with which an embodiment may be implemented.

FIG. 11 is a block diagram that illustrates an example computer system with which an embodiment may be implemented. In the example of FIG. 11, a computer system 1100 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 1100 includes an input/output (I/O) subsystem 1102, which may include a bus and/or other communication mechanism(s) for communicating information and/or instructions between the components of the computer system 1100 over electronic signal paths. The I/O subsystem 1102 may include an I/O controller, a memory controller, and at least one I/O port. The electronic signal paths are represented schematically in the drawings, such as lines, unidirectional arrows, or bidirectional arrows.

At least one hardware processor 1104 is coupled to I/O subsystem 1102 for processing information and instructions.

Hardware processor 1104 may include, for example, a general-purpose microprocessor or microcontroller and/or a special-purpose microprocessor such as an embedded system or a graphics processing unit (GPU), or a digital signal processor or ARM processor. Processor 1104 may comprise an integrated arithmetic logic unit (ALU) or be coupled to a separate ALU.

Computer system 1100 includes one or more units of memory 1106, such as a main memory, coupled to I/O subsystem 1102 for electronically digitally storing data and instructions to be executed by processor 1104. Memory 1106 may include volatile memory such as various forms of random-access memory (RAM) or other dynamic storage device. Memory 1106 also may be used for storing temporary variables or other intermediate information during the execution of instructions to be executed by processor 1104. Such instructions, when stored in non-transitory computer-readable storage media accessible to processor 1104, can render computer system 1100 into a special-purpose machine customized to perform the operations specified in the instructions.

Computer system 1100 includes non-volatile memory such as read-only memory (ROM) 1108 or other static storage devices coupled to I/O subsystem 1102 for storing information and instructions for processor 1104. The ROM 1108 may include various forms of programmable ROM (PROM), such as erasable PROM (EPROM) or electrically erasable PROM (EEPROM). A unit of persistent storage 1110 may include various forms of non-volatile RAM (NVRAM), such as FLASH memory, solid-state storage, magnetic disk, or optical disks such as CD-ROM or DVD-ROM and may be coupled to I/O subsystem 1102 for storing information and instructions. Storage 1110 is an example of a non-transitory computer-readable medium that may be used to store instructions and data which, when executed by the processor 1104, cause performing computer-implemented methods to execute the techniques herein.

The instructions in memory 1106, ROM 1108, or storage 1110 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 1100 may be coupled via I/O subsystem 1102 to at least one output device 1112. In one embodiment, output device 1112 is a digital computer display. Examples of a display that may be used in various embodiments include a touchscreen display, a light-emitting diode (LED) display, a liquid crystal display (LCD), or an e-paper display. Computer system 1100 may include other type(s) of output devices 1112, alternatively or in addition to a display device. Examples of other output devices 1112 include printers, ticket printers, plotters, projectors, sound cards or video cards, speakers, buzzers or piezoelectric devices or other audible devices, lamps or LED or LCD indicators, haptic devices, actuators or servos.

At least one input device 1114 is coupled to I/O subsystem 1102 for communicating signals, data, command selections, or gestures to processor 1104. Examples of input devices 1114 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1116, which may perform cursor control or other automated control functions such as navigation in a graphical interface on a display screen, alternatively or in addition to input functions. The control device 1116 may be a touchpad, a mouse, a trackball, or cursor direction keys for communicating direction information and command selections to processor 1104 and for controlling cursor movement on an output device 1112, such as a display. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism, or other control device. An input device 1114 may include a combination of multiple input devices, such as a video camera and a depth sensor.

In another embodiment, computer system 1100 may comprise an Internet of Things (IoT) device in which one or more of the output device 1112, input device 1114, and control device 1116 are omitted. Or, in such an embodiment, the input device 1114 may comprise one or more cameras, motion detectors, thermometers, microphones, seismic detectors, other sensors or detectors, measurement devices or encoders, and the output device 1112 may comprise a special-purpose display such as a single-line LED or LCD display, one or more indicators, a display panel, a meter, a valve, a solenoid, an actuator or a servo.

When computer system 1100 is a mobile computing device, input device 1114 may comprise a global positioning system (GPS) receiver coupled to a GPS module that is capable of triangulating to a plurality of GPS satellites, determining and generating geo-location or position data such as latitude-longitude values for a geophysical location of the computer system 1100. Output device 1112 may include hardware, software, firmware, and interfaces for generating position reporting packets, notifications, pulse or heartbeat signals, or other recurring data transmissions that specify a position of the computer system 1100, alone or in combination with other application-specific data, directed toward host computer 1124 or server computer 1130.

Computer system 1100 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 1100 in response to processor 1104 executing at least one sequence of at least one instruction contained in main memory 1106. Such instructions may be read into main memory 1106 from another storage medium, such as storage 1110. Execution of the sequences of instructions contained in main memory 1106 causes processor 1104 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 1110. Volatile media includes dynamic memory, such as memory 1106. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 1102. Transmission media can also be acoustic or light waves generated during radio-wave and infrared data communications.

Various forms of media may carry at least one sequence of at least one instruction to processor 1104 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 1100 can receive the data on the communication link and convert the data to a format that can be read by computer system 1100. For instance, a receiver such as a radio frequency antenna or an infrared detector can receive the data carried in a wireless or optical signal and appropriate circuitry can provide the data to I/O subsystem 1102 such as place the data on a bus. I/O subsystem 1102 carries the data to memory 1106, from which processor 1104 retrieves and executes the instructions. The instructions received by memory 1106 may optionally be stored on storage 1110 either before or after execution by processor 1104.

Computer system 1100 also includes a communication interface 1118 coupled to a bus or I/O subsystem 502. Communication interface 1118 provides a two-way data communication coupling to a network link(s) 1120 directly or indirectly connected to at least one communication network, such as network 1122 or a public or private cloud on the Internet. For example, communication interface 1118 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 1122 broadly represents a local area network (LAN), wide-area network (WAN), campus network, internetwork, or any combination thereof. Communication interface 1118 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1118 sends and receives electrical, electromagnetic, or optical signals over signal paths that carry digital data streams representing various types of information.

Network link 1120 typically provides electrical, electromagnetic, or optical data communication directly or through at least one network to other data devices, using, for example, satellite, cellular, Wi-Fi, or BLUETOOTH technology. For example, network link 1120 may connect through network 1122 to a host computer 1124.

Furthermore, network link 1120 may connect through network 1122 or to other computing devices via internetworking devices and/or computers operated by an Internet Service Provider (ISP) 1126. ISP 1126 provides data communication services through a worldwide packet data communication network called Internet 1128. A server computer 1130 may be coupled to Internet 1128. Server computer 1130 broadly represents any computer, data center, virtual machine, or virtual computing instance with or without a hypervisor, or computer executing a containerized program system such as DOCKER or KUBERNETES. Server computer 1130 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1100 and server computer 1130 may form elements of a distributed computing system that includes other computers, a processing cluster, a server farm, or other organizations of computers that cooperate to perform tasks or execute applications or services. Server computer 1130 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML. JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 1130 may comprise a web application server that hosts a presentation layer, application layer, and data storage layer, such as a relational database system using a structured query language (SQL) or no SQL, an object store, a graph database, a flat file system or other data storage.

Computer system 1100 can send messages and receive data and instructions, including program code, through the network(s), network link 1120, and communication interface 1118. In the Internet example, server computer 1130 might transmit a requested code for an application program through Internet 1128, ISP 1126, local network 1122, and communication interface 1118. The received code may be executed by processor 1104 as it is received and/or stored in storage 1110 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1104. While each processor 1104 or core of the processor executes a single task at a time, computer system 1100 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed using a global energy management system computer in an energy and load resource network, the energy and load resource network comprising a plurality of energy generating resources, a plurality of load resources, a plurality of energy storage resources, and a plurality of virtual energy resources, the computer-implemented method comprising:

receiving a plurality of energy market data and a plurality of capacity market data items;

creating and storing a long-term forecast of one or more of energy supply, energy demand, resource topology, and market trends; using the long-term forecast, creating and storing a day-ahead forecast of one or more of energy supply, energy demand, resource topology, system conditions, and outages; using the day-ahead forecast, creating and storing a real-time forecast of one or more of a change in energy supply, energy demand, system conditions, and outages;

executing an inference stage of a trained machine learning model over the plurality of energy market data and the plurality of capacity market data items to output predictions of generating capacity and load requirements;

executing an optimization algorithm over the predictions of generating capacity and load requirements to output a plurality of optimized generating capacity and load requirements;

forming a plurality of operational instructions for a plurality of the resources in the energy and load resource network, the plurality of operational instructions being formatted to cause the plurality of the resources in the energy and load resource network to conform to the plurality of optimized generating capacity and load requirements;

executing a real-time optimizer for the plurality of the resources in the energy and load resource network, the real-time optimizer being programmed to maximize one or more of arbitrage and regulation dispatch revenue against a plurality of constraints comprising meeting day-ahead commitments within resource limits;

transmitting the plurality of operational instructions to a plurality of local energy management systems respectively associated with the plurality of the resources in the energy and load resource network; and transmitting the plurality of operational instructions to the plurality of the resources in the energy and load resource network to instruct the plurality of the resources in the energy and load resource network to conform to the plurality of optimized generating capacity and load requirements.

2. The computer-implemented method of claim 1, further comprising:

executing the optimization algorithm by receiving long-term market data representing one or more of long-term energy prices and ancillary prices, executing a site resource optimization for multiple sites of nodes in the energy and load resource network, multiple resources among the plurality of energy generating resources, the plurality of load resources, the plurality of energy storage resources, and the plurality of virtual energy resources, including site-resource co-optimization, and outputting a site-resource plan.

3. The computer-implemented method of claim 1, further comprising:

receiving price forecast data representing one or more of energy prices and ancillary prices;

executing a network optimization for multiple energy resource assets, multiple energy markets, and probabilistic price forecasts; and outputting a day-ahead plan for use of the multiple energy resource assets.

4. The computer-implemented method of claim 1, further comprising:

receiving updated operating plan data representing then-current ancillary services commitments, ancillary service deployment data, stage of charge data, resource limit data, and the real-time forecast; and transmitting adjusted telemetry data to a grid regulator.

5. One or more non-transitory computer-readable storage media storing one or more sequences of instructions which, when executed using one or more processors, cause the one or more processors to execute:

a computer-implemented method executed using a global energy management system computer in an energy and load resource network, the energy and load resource network comprising a plurality of energy generating resources, a plurality of load resources, a plurality of energy storage resources, and a plurality of virtual energy resources, the computer-implemented method comprising:

receiving a plurality of energy market data and a plurality of capacity market data items;

creating and storing a long-term forecast of one or more of energy supply, energy demand, resource topology, and market trends; using the long-term forecast, creating and storing a day-ahead forecast of one or more of energy supply, energy demand, resource topology, system conditions, and outages; using the day-ahead forecast, creating and storing a real-time forecast of one or more of a change in energy supply, energy demand, system conditions, and outages;

executing an inference stage of a trained machine learning model over the plurality of energy market data and the plurality of capacity market data items to output predictions of generating capacity and load requirements;

executing an optimization algorithm over the predictions of generating capacity and load requirements to output a plurality of optimized generating capacity and load requirements;

forming a plurality of operational instructions for a plurality of the resources in the energy and load resource network, the plurality of operational instructions being formatted to cause the plurality of the resources in the energy and load resource network to conform to the plurality of optimized generating capacity and load requirements;

executing a real-time optimizer for the plurality of the resources in the energy and load resource network, the real-time optimizer being programmed to maximize one or more of arbitrage and regulation dispatch revenue against a plurality of constraints comprising meeting day-ahead commitments within resource limits;

transmitting the plurality of operational instructions to a plurality of local energy management systems respectively associated with the plurality of the resources in the energy and load resource network; and transmitting the plurality of operational instructions to the plurality of the resources in the energy and load resource network to instruct the plurality of the resources in the energy and load resource network to conform to the plurality of optimized generating capacity and load requirements.

6. The one or more non-transitory computer-readable storage media of claim 5, further comprising:

executing the optimization algorithm by receiving long-term market data representing one or more of long-term energy prices and ancillary prices, executing a site resource optimization for multiple sites of nodes in the energy and load resource network, multiple resources among the plurality of energy generating resources, the plurality of load resources, the plurality of energy storage resources, and the plurality of virtual energy resources, including site-resource co-optimization, and outputting a site-resource plan.

7. The one or more non-transitory computer-readable storage media of claim 5, further comprising:

receiving price forecast data representing one or more of energy prices and ancillary prices;

executing a network optimization for multiple energy resource assets, multiple energy markets, and probabilistic price forecasts; and outputting a day-ahead plan for use of the multiple energy resource assets.

8. The one or more non-transitory computer-readable storage media of claim 5, further comprising:

receiving updated operating plan data representing then-current ancillary services commitments, ancillary service deployment data, stage of charge data, resource limit data, and the real-time forecast; and transmitting adjusted telemetry data to a grid regulator.

* * * * *